(12) United States Patent
Scherer et al.

(10) Patent No.: US 7,128,470 B2
(45) Date of Patent: Oct. 31, 2006

(54) BIPOLAR OPTICAL CONNECTOR

(75) Inventors: Thomas Scherer, Lüdenscheid (DE); Wolfgang Mohs, Iserlohn (DE); Wilfried Heringhaus, Herne (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 11/019,000

(22) Filed: Dec. 21, 2004

(65) Prior Publication Data
US 2005/0117852 A1 Jun. 2, 2005

Related U.S. Application Data

(63) Continuation of application No. PCT/EP03/06424, filed on Jun. 18, 2003.

(30) Foreign Application Priority Data
Jun. 22, 2002 (DE) .................. 102 28 008

(51) Int. Cl.
*G02B 6/38* (2006.01)
*H01R 13/627* (2006.01)

(52) U.S. Cl. ................... 385/59; 385/60; 385/70; 385/71; 385/72; 439/352; 439/355; 439/347

(58) Field of Classification Search .............. 385/59, 385/60, 71, 53, 89
See application file for complete search history.

(56) References Cited

U.S. PATENT DOCUMENTS

| 5,337,385 | A | * | 8/1994 | Baderschneider et al. .... 385/59 |
| 5,386,487 | A | | 1/1995 | Briggs et al. |
| 5,579,425 | A | * | 11/1996 | Lampert et al. ............... 385/59 |
| 6,059,461 | A | * | 5/2000 | Aoki et al. .................... 385/60 |
| 6,200,040 | B1 | * | 3/2001 | Edwards et al. .............. 385/78 |
| 6,240,228 | B1 | * | 5/2001 | Chen et al. ................... 385/53 |
| 6,746,266 | B1 | * | 6/2004 | Cheng ........................ 439/352 |

FOREIGN PATENT DOCUMENTS

| EP | 0 597 501 A1 | 11/1993 |
| EP | 0 647 865 A | 4/1995 |
| EP | 0 718 652 A2 | 10/1995 |
| EP | 0 718 652 A | 6/1996 |
| EP | 0 996 011 A1 | 10/1999 |
| EP | 0 996 011 A | 4/2000 |
| EP | 0 996 012 A | 4/2000 |
| WO | WO 02/08805 A2 | 7/2001 |

* cited by examiner

*Primary Examiner*—Frank G. Font
*Assistant Examiner*—Erin Chiem
(74) *Attorney, Agent, or Firm*—Brooks Kushman P.C.

(57) ABSTRACT

A bipolar optical plug-and-socket connector for connecting two optical fibers with other optical fibers and electro-optical transmission and receiving devices includes an optical housing for holding two fiber end sleeves in which each sleeve terminates a fiber. The optical housing includes first and second housing portions which have different external forms from one another. The housing portions hold respective ones of the sleeves when the sleeves are inserted into the housing portions along a plugging direction. The housing portions join to one another in a direction running perpendicular to the plugging direction to place the optical housing in a fully assembled position while the housing portions hold the sleeves. Each housing portion includes an end lock for locking the sleeves in the housing portions. The end locks of the housing portions lock the sleeve held in the other of the housing portions when the housing portions are joined together.

16 Claims, 2 Drawing Sheets

BIPOLAR OPTICAL CONNECTOR

CROSS-REFERENCE TO RELATED APPLICATIONS

This is a continuation of International Application PCT/EP2003/006424, published in German, with an international filing date of Jun. 18, 2003, which claims priority to DE 102 28 008.8 filed Jun. 22, 2002, which are both hereby incorporated by reference.

BACKGROUND OF THE INVENTION

1. Field of the Invention

The present invention generally relates to a bipolar optical plug-and-socket connector for connecting two optical fibers with other optical fibers, electro-optical transmission devices, or electro-optical receiving devices in which the bipolar optical connector has an optical housing for holding two fiber end sleeves which terminate respective ends of the two optical fibers.

2. Background Art

Optical plug-and-socket connectors connect optical fibers with one another and to devices having opto-electronic transducers. Optical fibers are used to build so-called ring bus structures which are especially prevalent in automobiles. In a ring bus structure, optical fibers connect several devices in a ring-shaped configuration to enable the devices to communicate with one another through a data bus. Connecting devices to a ring-shaped optical fiber configuration involves providing each device with a bipolar connection. For each device, one connection terminal is assigned to a transmission line of the device and the other connection terminal is assigned to a receiving line of the device. The transmission line of a given device connects to the receiving line of a subsequent device in the ring, and the receiving line of the given device connects to the transmission line of a preceding device in the ring.

Plug-and-socket connectors used in such a ring-shaped configuration can advantageously be designed as bipolar plug-and-socket connectors. However, to make things easier to handle, it is possible for the final assembly of the plug-and-socket connectors with the optical fibers to be done once assembly of the ring bus system is complete. Only the first ends of a set of two optical fibers can be preassembled because the other ends of the two optical fibers held in a bipolar plug-and-socket connector of a given device are connected with two different devices. The two different devices are neighboring devices in the ring. In order to protect the fiber end sleeves, and thus protect the sensitive end surfaces of the other ends of the optical fibers, it is generally necessary to place additional protective caps or the like on them for protection during transport until they are used to connect devices to the ring.

Performing the final assembly at the time when the ring line is being put together presents an additional danger of optical fiber mix-up. This is because only the prefabricated part of the plug-and-socket connector can be coded while the loose optical fiber ends, which still have to be inserted into the plug-and-socket connectors for the neighboring devices, can be mixed up. This danger is addressed by labeling the plug-and-socket connectors on their outside surfaces with printed arrow symbols which the operator assembling the system is supposed to heed.

SUMMARY OF THE INVENTION

A bipolar optical plug-and-socket connector in accordance with the present invention is advantageous over the presented prior art in that in a preassembled condition both ends of the optical fibers already have housing parts on them. The housing parts protect the sensitive end surfaces of the optical fibers without requiring additional measures and minimize the danger of an optical fiber mix-up.

These advantages are possible because the bipolar optical plug-and-socket connector includes an optical housing having two housing portions or housing halves. The housing portions have different external physical forms from one another in order to enable the housing portions to be distinguishable from one another. Each housing portion is operable to hold a fiber end sleeve which terminates an optical fiber. The fiber end sleeves insert into respective housing portions along a plugging direction in order to be held by the housing portions. As a result, the housing portions hold the fiber end sleeves and the optical fiber ends terminated in the fiber end sleeves when the fiber end sleeves are inserted into the housing portions along the plugging direction. The housing portions with the fiber end sleeves inserted therein join together in a direction running perpendicular to the plugging direction in order to assemble the optical housing in a final assembly position with the two optical fibers connected thereto.

Thus, each individual optical fiber can be preassembled with each of its two ends already inserted into one of the two different housing portions. Each housing portion includes preliminary means for locking the inserted fiber end sleeve into the housing portion. The locking motion provided by the preliminary means is done from behind the inserted fiber end sleeve in the plugging direction. This locking motion provides security for transport of the individual optical fibers inserted into and covered by the respective housing portions.

When the ring bus is assembled, the only thing that has to be done is to join together, at each device, each of the two different housing portions of the optical fibers which come to it from the two neighboring devices. Although the different design of the housing portions prevents incorrect assembly, it could be desirable to facilitate assembly even more, for example, by identifying the housing portions with different colors.

In carrying out the above object and other objects, the present invention provides a bipolar optical plug-and-socket connector for connecting two optical fibers with one or more other optical fibers, electro-optical transmission devices, or electro-optical receiving devices. The connector includes an optical housing for holding two fiber end sleeves in which each fiber end sleeve terminates an optical fiber. The optical housing includes a first housing portion and a second housing portion. The housing portions have different external forms from one another. The housing portions hold respective ones of the fiber end sleeves when the fiber end sleeves are inserted into the housing portions along a plugging direction. The housing portions join to one another in a direction inclined to the plugging direction to place the optical housing in a fully assembled position while the housing portions hold the fiber end sleeves.

In carrying out the above object and other objects, the present invention provides a method for connecting two optical fibers with one or more other optical fibers, electro-optical transmission devices, or electro-optical receiving devices. The method includes terminating a first optical fiber in a first fiber end sleeve and terminating a second optical fiber in a second fiber end sleeve. The first fiber end sleeve is then inserted along a plugging direction into a first housing portion having a first external form such that the first housing portion holds the first fiber end sleeve with the first optical fiber terminated therein. The second fiber end sleeve is then inserted along the plugging direction into a second housing portion having a second external form different than the first external form such that the second housing portion holds the second fiber end sleeve with the second optical fiber terminated therein. The housing portions are then combined along a direction perpendicular to the plugging direction to form an optical housing which holds the two fiber end sleeves with the two optical fibers terminated therein.

BRIEF DESCRIPTION OF THE DRAWINGS

Further advantageous embodiments of the present invention are explained in detail using the sample embodiment shown in the figures in which.

DETAILED DESCRIPTION OF THE PREFERRED EMBODIMENT(S)

Figure 1:
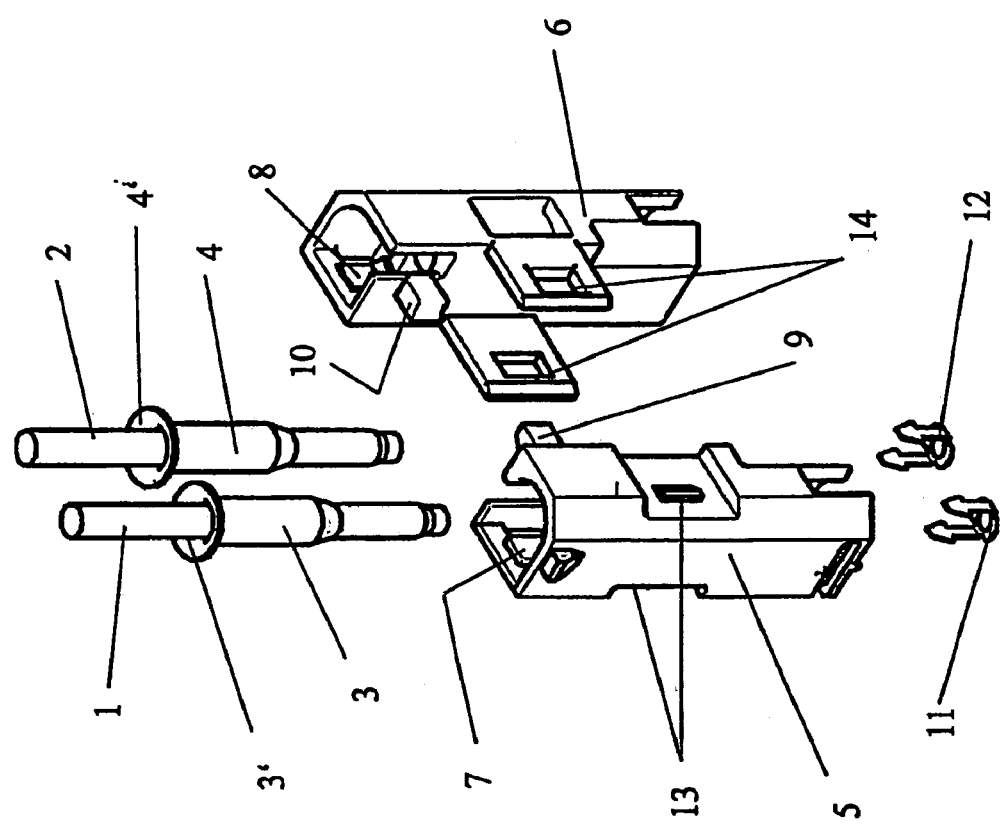
FIG. 1 illustrates an exploded perspective view of a bipolar optical plug-and-socket connector in accordance with an embodiment of the present invention prior to assembly.

As shown in the FIGS., a bipolar optical plug-and-socket connector in accordance with the present invention includes a first housing portion or half 5 and a second housing portion or half 6. First and second housing portions 5, 6 have different external physical forms from one another. That is, first and second housing portions 5, 6 are of different types from one another. First and second housing portions 5, 6 are operable to receive respective fiber end sleeves 3, 4. Fiber end sleeves 3, 4 terminate respective optical fibers 1, 2. As such, first and second housing portions 5, 6 receive the terminated ends of optical fibers 1, 2 upon the fiber end sleeves being inserted into the housing portions.

When optical fiber 1 is preassembled with an end terminated in fiber end sleeve 3, fiber end sleeve 3 inserts into first housing portion 5 to provide the first housing portion with optical fiber 1. Fiber end sleeve 3 inserts into first housing portion 5 from behind along a plugging direction of the bipolar optical connector. Likewise, when optical fiber 2 is preassembled with an end terminated in fiber end sleeve 4, fiber end sleeve 4 inserts into second housing portion 6 to provide the second housing portion with optical fiber 2. Fiber end sleeve 4 inserts into second housing portion 6 from behind along the plugging direction.

In order for the two different housing portions to be readily distinguishable from one another, and, consequently, to make it easier to check as to whether each optical fiber 1, 2, is provided with two different housing portions on its end, the two types of housing portions are made in different colors. First and second housing portions 5, 6 have preliminary locking means for fastening optical fibers 1, 2 to the housing portions to prevent the housing portions from being lost from the optical fibers once the optical fibers are provided in the housing portions. Each preliminary locking means is in the form of a respective spring arm 7, 8. Spring arms 7, 8 of respective housing portions 5, 6 bend back when respective fiber end sleeves 3, 4 are inserted into the respective housing portions. In the final insertion position of fiber end sleeves 3, 4, spring arms 7, 8 lock behind respective fiber end sleeve projecting areas 3', 4' and come to rest against the projecting areas.

To set a defined distance between the end surface of an optical fiber and the corresponding mating part such as another optical fiber or an opto-electronic element in a plug-and-socket connector, first and second housing portions 5, 6 have respective spacers 11, 12 in their front areas. Each spacer 11, 12 includes a flat ring whose internal diameter corresponds to that of optical fibers 1, 2. The ring surface of each spacer 11, 12 lies on the ring-shaped front edge of a respective fiber end sleeve 3, 4 when the fiber end sleeve is inserted into a housing portion. Spacer 11, 12 are preferably made of metal in order to ensure their thickness with high precision. Each spacer 11, 12 has little holding arms on its side. The holding arms bend backwards by 90° in the plugging direction to hold spacers 11, 12 in respective housing portions 5, 6. Spacers 11, 12 are held in respective housing portions 5, 6 so that they are movable and only assume a final position in the housing portions which establishes a defined distance upon cooperating with corresponding mating parts of the bipolar optical plug-and-socket connector.

Assembling the ring line involves connecting, in front of every device, two different housing portions 5, 6 having two optical fibers 1, 2 to from the bipolar optical plug-and-socket connector. Forming the bipolar optical plug-and-socket connector is done by joining the two different housing portions 5, 6 together in a direction running perpendicular to the plugging direction. The two joined different housing portions 5, 6 form the bipolar optical plug-and-socket connector of the present invention in a fully assembled form (shown in FIG. 2A).

Figure 2B:
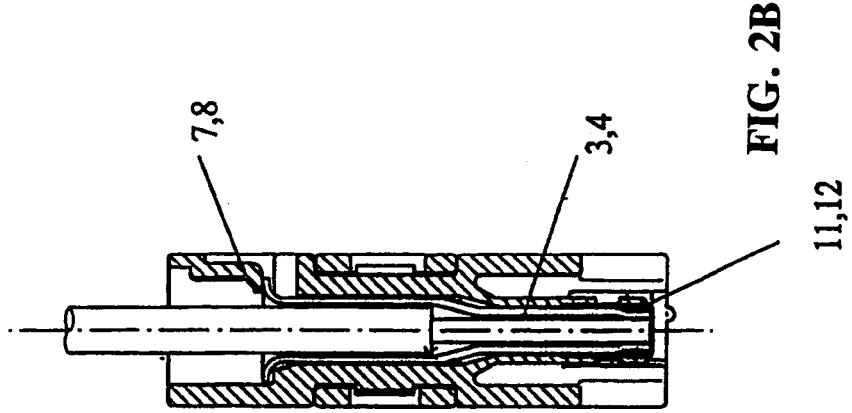
FIG. 2B illustrates a cross-sectional side view of the bipolar optical plug-and-socket connector shown in FIG. 1 in the assembled position.
Figure 2A:
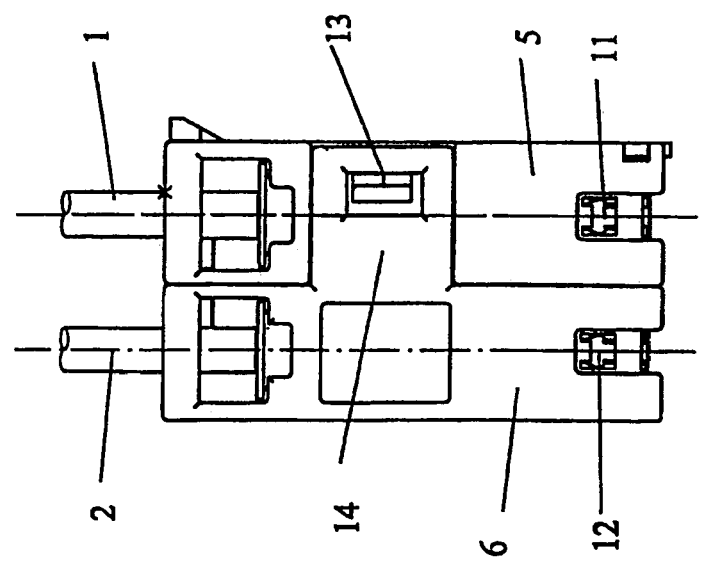
FIG. 2A illustrates a perspective view of the bipolar optical plug-and-socket connector shown in FIG. 1 in the assembled position.
Figure 2C:
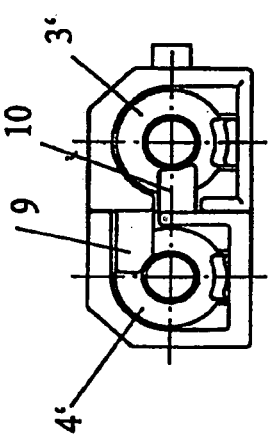
FIG. 2C illustrates a cross-sectional top view of the bipolar optical plug-and-socket connector shown in FIG. 1 in the assembled position.

When housing portions 5, 6 are joined together, bars of each housing portion act as housing portion locking means 9, 10 and come to lie behind the fiber end sleeve projecting area 4', 3' that is held in the respective other housing portion 6, 5 to thereby lock the housing portions in the fully assembled form (shown in FIG. 2A). In the fully assembled form of bipolar optical plug-and-socket connector, cooperating clip elements 13, 14 of the two housing portions 5, 6 engage into one another to thereby prevent the possibility of the housing portions from being unintentionally separated.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the invention.

What is claimed is:

1. A bipolar optical plug-and-socket connector for connecting two optical fibers with one or more other optical fibers, electro-optical transmission devices, or electro-optical receiving devices, the connector comprising:

an optical housing for holding two fiber end sleeves in which each fiber end sleeve terminates an optical fiber; the optical housing having a first housing portion and a second housing portion which are releaseably separable and joinable to one another, the housing portions being of different types and having different external physical body forms from one another in order to enable the housing portions to be readily distinguishable from one another by a user when the housing portions are separated from one another and when the housing portions are joined to one another, the housing portions holding respective ones of the fiber end sleeves when the fiber end sleeves are inserted into the housing portions along a plugging direction, the housing portions being joined to one another in a direction inclined to the plugging direction to place the optical housing in a fully assembled position while the housing portions hold the fiber end sleeves;

wherein each housing portion includes a housing portion lock, the housing portion locks being separate from one another, wherein the housing portion lock of each housing portion radially inserts into the other housing portion in order to lock the fiber end sleeve held in the other housing portion when the housing portions have been joined together.

2. The connector of claim 1 wherein:

each housing portion includes a preliminary lock for locking the respective fiber end sleeve within the housing portion.

3. The connector of claim 2 wherein:

the preliminary lock includes a spring arm which bends back when the respective fiber end sleeve is inserted into the housing portion, wherein the spring arm engages a projecting area of the respective fiber end sleeve from behind to lock the respective fiber end sleeve within the housing portion.

4. The connector of claim 1 wherein:

the housing portions have different colors.

5. The connector of claim 1 wherein:

each housing portion includes a clip element, wherein the clip elements cooperate with one another to lock the housing portions to one another when the housing portions are joined to one another.

6. The connector of claim 1 wherein:

each housing portion includes a spacer for setting a defined distance between a corresponding mating part and an end surface of the optical fiber terminated in the respective fiber end sleeve held by the housing portion.

7. The connector of claim 6 wherein:

the spacer includes a flat metal ring which is movably held in the housing portion.

8. A method for connecting two optical fibers with one or more other optical fibers, electro-optical transmission devices, or electro-optical receiving devices, the method comprising:

terminating a first optical fiber in a first fiber end sleeve and terminating a second optical fiber in a second fiber end sleeve;

inserting the first fiber end sleeve along a plugging direction into a first housing portion of a first type, the first housing portion having a first external physical body form such that the first housing portion holds the first fiber end sleeve with the first optical fiber terminated therein;

inserting the second fiber end sleeve along the plugging direction into a second housing portion of a second type different than the first type, the second housing portion having a second external physical body form different than the first external physical body form such that the second housing portion holds the second fiber end sleeve with the second optical fiber terminated therein, the first and second housing portions being releaseably separable and combinable to one another, and the first and second housing portions respectively having the different first and second physical external body forms to be readily distinguishable from one another by a user when the housing portions are separated from one another and when the housing portions are combined with one another; and combining the housing portions along a direction perpendicular to the plugging direction to form an optical housing which holds the two fiber end sleeves with the two optical fibers terminated therein, wherein each housing portion includes a housing portion lock which are separate from one another, wherein combining the housing portions includes locking the first fiber end sleeve held in the first housing portion by radially inserting the housing portion lock of the second housing portion into the first housing portion, and locking the second fiber end sleeve held in the second housing portion by radially inserting the housing portion lock of the first housing portion into the second housing portion.

9. The method of claim 8 wherein each housing portion includes a clip element, the method further comprising:

locking the housing portions forming the optical housing in place by having the clip elements cooperate with one another.

10. The method of claim 8 wherein each housing portion includes a spacer, the method further comprising:

setting a distance between a corresponding mating part and an end surface of the first optical fiber terminated in the first fiber end sleeve held by the first housing portion using the spacer of the first housing portion; and setting a distance between a corresponding mating part and an end surface of the second optical fiber terminated in the second fiber end sleeve held by the second housing portion using the spacer of the second housing portion.

11. A bipolar optical plug-and-socket connector for connecting two optical fibers with other optical fibers, electro-optical transmission devices, or electro-optical receiving devices, the connector comprising:

an optical housing for holding two fiber end sleeves in which each fiber end sleeve terminates an optical fiber;

the optical housing having a first housing portion and a second housing portion which are releaseably separable and joinable to one another, the housing portions being of different types and having different external physical body forms from one another and having different colors from one another in order to enable the housing portions to be readily distinguishable from one another by a user when the housing portions are separated from one another and when the housing portions are joined to one another, the housing portions holding respective ones of the fiber end sleeves when the fiber end sleeves are inserted into the housing portions along a plugging direction, the housing portions being joined to one another in a direction running perpendicular to the plugging direction to place the optical housing in a fully assembled position while the housing portions hold the fiber end sleeves;

wherein each housing portion includes a housing portion lock for locking the fiber end sleeves in the housing portions, the housing portion locks being separate from one another, wherein the housing portion locks of the housing portions radially insert into the other of the housing portions to lock the fiber end sleeve held in the other of the housing portions after the housing portions have been joined together.

12. The connector of claim 11 wherein:

each housing portion includes a preliminary lock for locking the respective fiber end sleeve within the housing portion.

13. The connector of claim 12 wherein:

the preliminary lock includes a spring arm which bends back when the respective fiber end sleeve is inserted into the housing portion, wherein the spring arm engages a projecting area of the respective fiber end sleeve from behind to lock the respective fiber end sleeve within the housing portion.

14. The connector of claim 11 wherein:

each housing portion includes a clip element, wherein the clip elements cooperate with one another to lock the housing portions to one another when the housing portions are joined to one another.

15. The connector of claim 11 wherein:

each housing portion includes a spacer for setting a defined distance between a corresponding mating part and an end surface of the optical fiber terminated in the respective fiber end sleeve held by the housing portion.

16. The connector of claim 15 wherein:

the spacer includes a flat metal ring which is movably held in the housing portion.

* * * * *